(12) United States Patent
Wömpner et al.

(10) Patent No.: US 7,712,591 B2
(45) Date of Patent: *May 11, 2010

(54) COMPOSITE PROFILE AND METHOD FOR MANUFACTURING THE COMPOSITE PROFILE

(75) Inventors: Diethelm Wömpner, Bodman-Ludwigshafen (DE); Timo Netzel, Volkertshausen (DE)

(73) Assignee: Alcan Technology and Management Ltd., Neuhausen am Rheinfall (CH)

( * ) Notice: Subject to any disclaimer, the term of this patent is extended or adjusted under 35 U.S.C. 154(b) by 527 days.

This patent is subject to a terminal disclaimer.

(21) Appl. No.: 11/711,397

(22) Filed: Feb. 27, 2007

(65) Prior Publication Data

US 2008/0121482 A1    May 29, 2008

(30) Foreign Application Priority Data

Nov. 24, 2006   (DE) .................... 10 2006 055 956
Dec. 29, 2006   (DE) .................... 10 2006 062 014

(51) Int. Cl.
*B60M 1/00*    (2006.01)

(52) U.S. Cl. ........................... 191/22 DM; 191/29 DM

(58) Field of Classification Search ............ 191/29 DM, 191/33 PM, 22 DM, 22 R, 29 R, 30; 238/148
See application file for complete search history.

(56) References Cited

U.S. PATENT DOCUMENTS 4,215,560 A    8/1980   Ames et al.

6,935,473 B1   8/2005   Gluck
6,983,834 B1   1/2006   Kraudy

FOREIGN PATENT DOCUMENTS

| DE | 25 46 026 | 4/1977 |
|---|---|---|
| DE | 44 10 688 | 10/1995 |
| DE | 10 2005 004 547 | 10/2006 |
| WO | 2006/081863 | 8/2006 |
| WO | 2007/098881 | 9/2007 |

OTHER PUBLICATIONS

U.S. Appl. No. 11/708,210, filed Feb. 20, 2007.*
U.S. Appl. No. 11/815,018, filed Jul. 30, 2007.*
International Search Report for PCT/EP2007/009508.

* cited by examiner

*Primary Examiner*—Mark T Le
(74) *Attorney, Agent, or Firm*—Bachman & LaPointe, P.C.

(57) ABSTRACT

A composite profile comprising an extruded aluminum alloy carrier profile comprising a rail head having a longitudinal axis B, the rail head comprises a surface and two longitudinal edges extending parallel to the longitudinal axis B and a metal channel shaped profile strip comprising a base portion spanning the surface of the rail head and parallel side legs which lie on the longitudinal edges of the head rail, an insert rod is provided on the parallel side legs which lie on the longitudinal edges of the head rail and engage in lateral slots provided in the two longitudinal edges of the rail head, wherein the profile strip is attached to the carrier profile under mechanical pretension by way of a weld seam which contacts the rail head of the extruded aluminum alloy carrier profile.

16 Claims, 4 Drawing Sheets

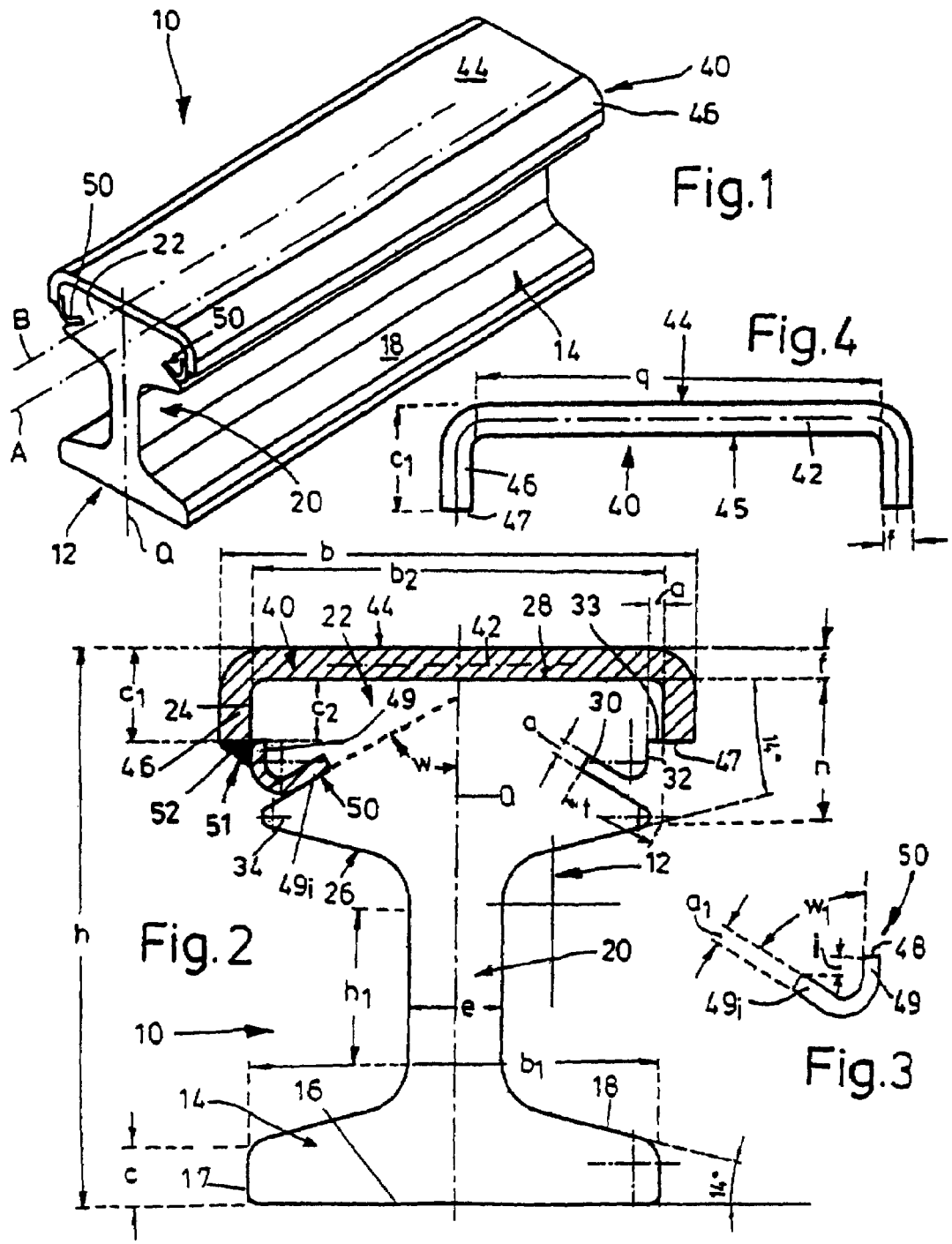

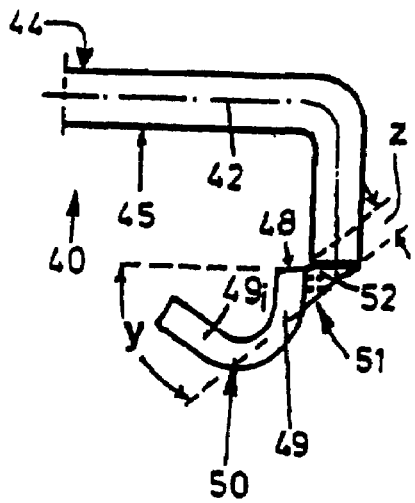
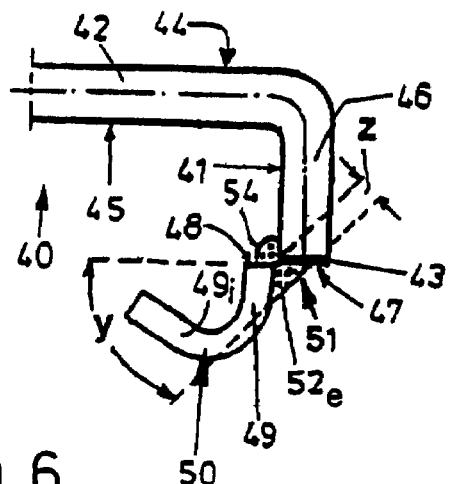
Fig.5          Fig.6
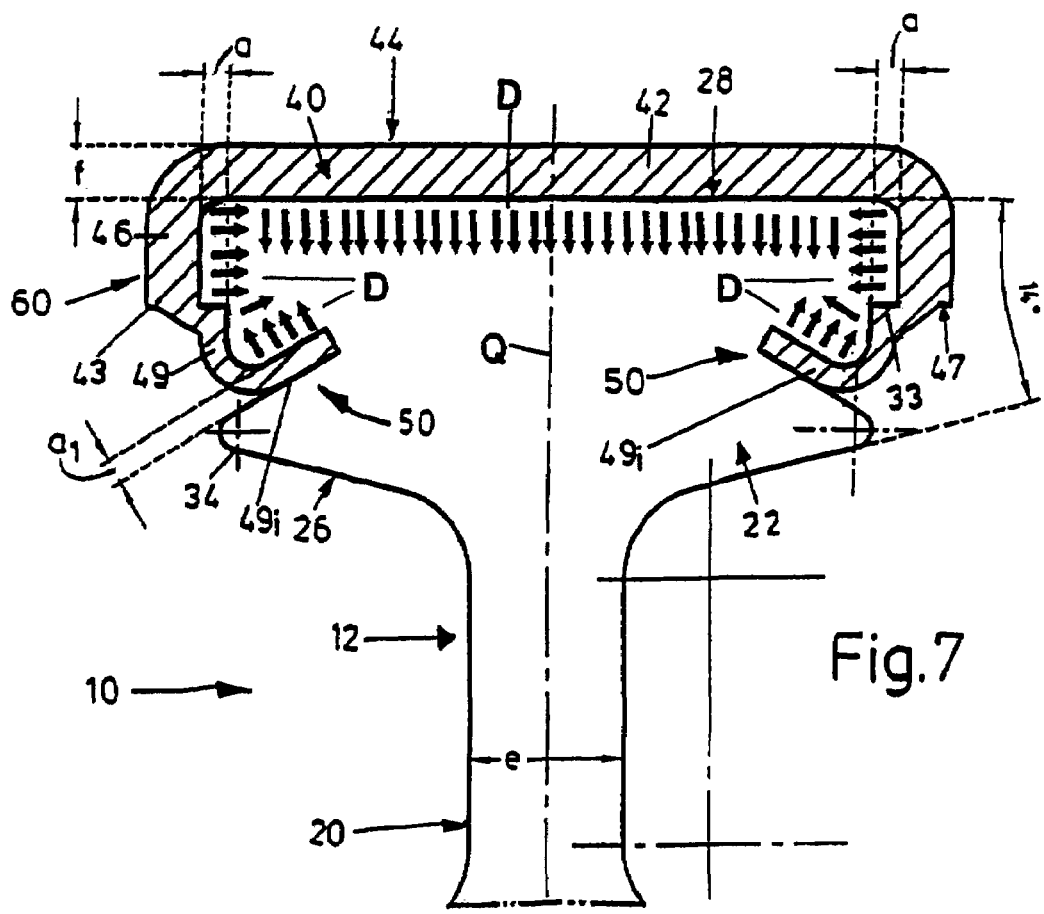
Fig.7

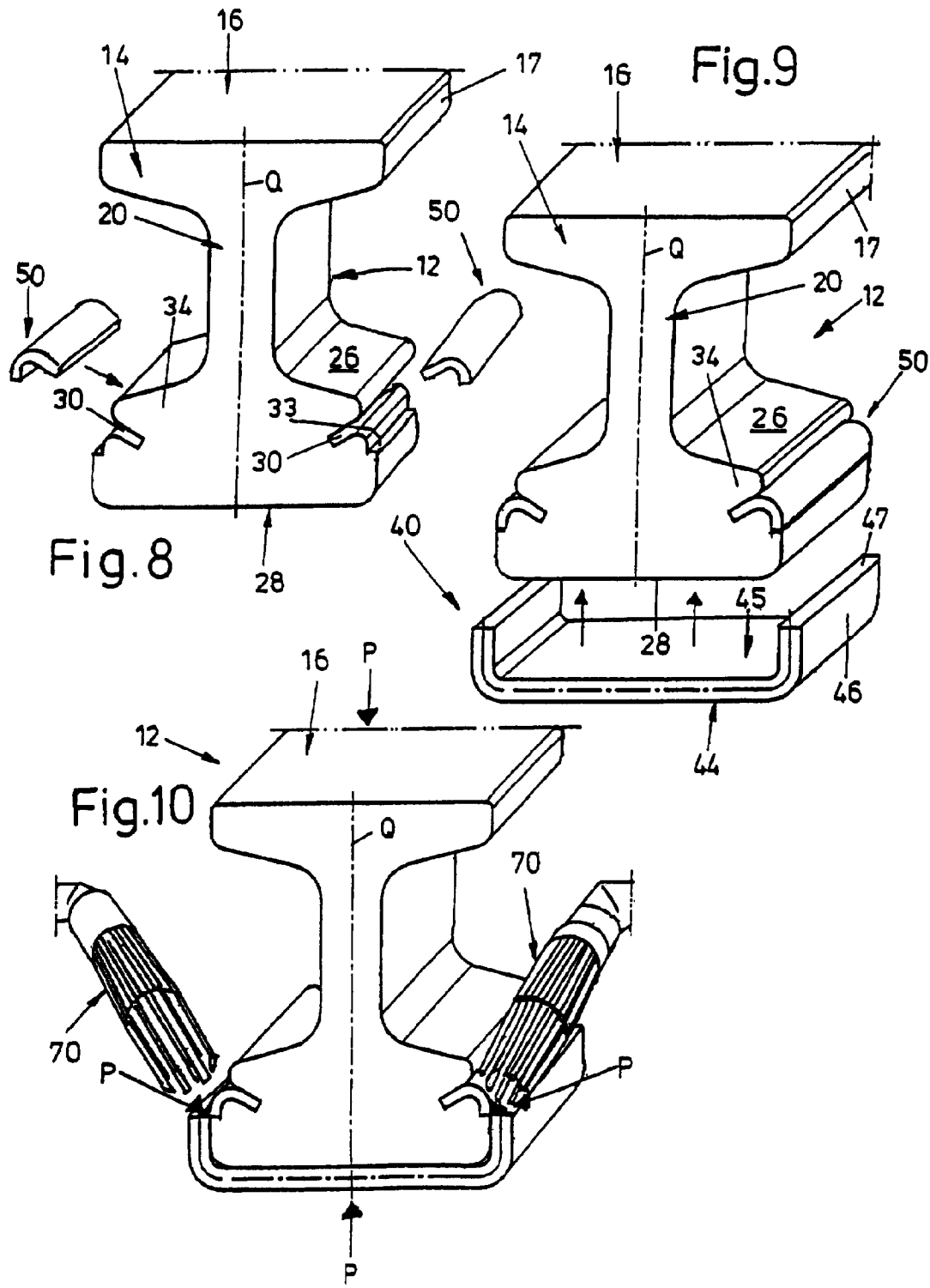

COMPOSITE PROFILE AND METHOD FOR MANUFACTURING THE COMPOSITE PROFILE

CROSS REFERENCE TO RELATED APPLICATIONS

This application is related to U.S. application Ser. No. 11/708,210 filed Feb. 20, 2007 and U.S. application Ser. No. 11/815,018 filed Jul. 30, 2007.

BACKGROUND OF THE INVENTION

The invention concerns a composite profile having a rail-like carrier profile extruded from light metal material as well as a profile strip made of a harder metal and resting on its top surface. The invention covers a method for manufacturing such a composite profile.

DE 24 32 541 A1 shows a method for manufacturing conductor rails from a carrier profile and at least one overlay which forms at least part of the surface of the carrier profile serving as the conductor and which consists of a profile strip of a different metal to the covering profile having high abrasion resistance. The free cross-sectional ends of the flat profile strip are formed by edge surfaces which are inclined towards each other and which in the fitted position fit snugly against correspondingly inclined edge strips of a depression in the carrier profile which receives the profile strip. During an extrusion operation the carrier profile is produced by forcing a block out through the shaping cross-section of an extrusion die, and at the same time the profile strip passes through the die opening or shaping cross-section parallel to the longitudinal axis of the die. During the extrusion operation an intimate metallic bond is formed between the two profile components. For instance, when the conductor rail is used to electrify rail-mounted vehicles, in cases of particularly high load the profile strip comes away from its light metal carrier profile in the long term in spite of the intimate metallic bond.

DE 198 40 720 A1, which describes a steel strip with flat bottom and steel strip arms integrally formed thereon at right angles, refers to the document described above. These arms are provided with recesses for receiving rivets, bolts, screws or caulked joints. Those steel strip arms are inserted in slots at right angles to the steel strip bottom or to the top surface of the carrier profile, and then fixed with the rivets or the like to the inner wall of the slot.

In DE 44 10 688 A1 can be found a composite profile having a carrier profile made of light metal and a profile strip connected thereto. The latter spans the surface of a rail head of the carrier profile, is shaped like a channel in cross-section and comprises in its side arms, projecting at a distance from each other from its inner surface on the side of the supporting body, shaped portions which are embedded in the supporting body. These shaped portions define undercut gaps which are filled by the metallic material of the supporting body in form-fit relationship. This form-fit connection is not subject to the faults described for the metallic bond.

A composite conductor rail element for supplying power to a rail vehicle with a coating made of a material of high mechanical strength which is rigidly fixed to a rod made of material which is a good conductor of electricity and which forms the sliding or contact surface for current collectors of the vehicle, is disclosed by DE 25 46 026 A1. The coating is fixed to the conductive rod which serves as the carrier by wedging or squeezing the edges of the coating into the conductive rod. In the coating is formed at least one indentation which runs in the longitudinal direction and which penetrates as far as the conductive rod. For wedging the edges of the coating, in the conductive rod is provided a groove which is divided by a lip. The latter leads to wedging of the coating on the conductive rod as soon as it has been at least partially wrapped round and pressed against the edge of the coating.

Conductor rails of which the wear components are attached to the live carrier profile by screws or additional inserts passing through them laterally, also proved to be disadvantageous. Other known manufacturing methods can disadvantageously lead to undulations on the surface of the covering profile, caused by caulking or stamping the carrier profile in stages.

Knowing this state of the art, the inventor set himself the aim of more extensively improving the connection between carrier profile and profile strip, while retaining the special capacity for economical manufacture.

SUMMARY OF THE INVENTION

The object is achieved by a composite profile having a rail-like carrier profile extruded from light metal material as well as a profile strip made of a harder metal and resting on its top surface, of which the cross-section has associated with it at either end a recess in the carrier profile, the carrier profile and profile strip being joined together in force-fit and/or form-fit relationship, characterised in that joined to the profile strip or covering profile which rests on the top or upper surface of the carrier profile at each of its longitudinal sides is an insert rod which is parallel to its longitudinal axis (B) and formed from the material of the profile strip or covering profile and which on the other hand engages in a lateral slot in the carrier profile and is connected to the profile strip by a weld seam, the channel-like profile strip being fixed by its anchor or insert rod to the carrier profile under mechanical prestressing.

According to the invention, joined to the profile strip or covering profile which rests on the top or upper surface of the carrier profile—preferably made of special steel—at each of its longitudinal sides is an insert rod which is parallel to its longitudinal axis and formed from the material of the profile strip or covering profile and which on the other hand engages in a lateral slot in the carrier profile and is connected to the profile strip by a weld seam; the channel-like profile strip is fixed by its anchor or insert rod to the carrier profile under mechanical prestressing.

According to a further characteristic of the invention, a channel-like insert rod of approximately V-shaped cross-section is used, which with the longitudinal edge of an outer channel arm is associated with the end face of a side arm of the profile strip and rigidly connected by the weld seam. In this case the other channel arm which is directed towards the longitudinal axis of the profile strip is to form with the outer channel arm an apex angle of less than 90° and be mounted in a slot inclined at a corresponding angle to the cross-sectional longitudinal axis of the carrier profile; this apex angle of the channel cross-section measures about 60° to 70°, preferably 65°.

Advantageously, the longitudinal edge of the outer channel arm runs at a short axial parallel distance from the free end of the other channel arm, i.e. the two arm ends almost define a common plane.

It is of particular importance that in the fitted position the end face of the side arm of the profile strip is to be approximately aligned with the longitudinal edge of the outer channel arm. The channel arm therefore does not abut against the inner surface of that profile strip apex, or abuts against it only slightly. Also a V-shaped cross-section of the slot is to be provided in the rail head of the carrier profile; one of the slot arms is a longitudinal recess in the lateral or longitudinal surface of the rail head, which ends at a radial cross-sectional step aligned with the end face of the side arm of the profile strip.

It is within the scope of the invention that the weld seam has an approximately triangular cross-section with two sides at right angles to each other, of which one is formed integrally with the end face of the profile strip and of which the other side is formed integrally with the outer surface of the associated channel arm of the insert rod. In a preferred embodiment the two sides of the approximately isosceles cross-section of the weld seam are connected by a hypotenuse as a sloping surface.

It proved to be favourable to let the weld seam with its sloping surface attach to the outer edge of the end face of the profile strip; the cross-sectional width of the weld seam here corresponds roughly to the thickness of the insert rod.

In another application the weld seam attaches to the end face of the profile strip at a distance from its outer edge, and the cross-sectional width of the weld seam is smaller than the thickness of the insert rod.

Of particular importance is a counter-bead of the weld seam which is made of its material which during the welding operation passes through between the adjoining regions of profile strip and insert rod at their inner surface and is bonded thereto. The weld seam and counter-bead run parallel to each other and in the fitted position form a unit.

In this connection it should be pointed out that the insert rods formed from steel are modified in such a way that lateral welding penetrates through to the light metal of the carrier profile. Due to welding through to the aluminium, the following advantages amongst others arise:

the contact resistance is uniformly good over the whole length, that is, regardless of tolerances;
current can be collected uniformly over the whole steel surface;
the possibility of the steel or profile strip 40 sliding on the carrier profile due to thermal stresses is excluded.

The invention also covers a method for manufacturing a composite profile of the embodiment described above, in which a carrier profile having a top surface and insertion slots accompanying the latter on both sides is extruded from light metal material, also in each insertion slot an insert rod is introduced, and a profile strip covering the top surface is applied to a section of the insert rod protruding from the insertion slot in such a way that the covering profile is subject to prestressing relative to the carrier profile.

The insert rod is rolled or pressed tight against the carrier profile with prestressing and welded to this profile strip throughout. Here it proved to be particularly advantageous to make a counter-bead connected parallel to the weld seam from its material in such a way that the latter is fixed to adjacent inner surfaces of the carrier profile and insert rod.

First, therefore, the anchoring strips, anchor rods or insert rods are laid or pressed or rolled into the light metal profile, in particular a basic aluminium profile, or rolled or pressed tight before welding or subsequently by permanent deformation of the carrier profile. Care must be taken here that the prestressing is built up between the partners. There is then provision for pressing the special steel covering profile onto the light metal carrier profile by means of a contact pressure roller of large diameter, and, under this prestressing, welding the anchoring strips or insert rods to the covering profile on the left and right simultaneously.

Moreover the so-called covering profile is preferably a special steel strip cut from a rolled coil, which by roll forming is given the desired shape or used directly as a cut strip. The insert rod is a special steel strip—preferably the same alloy as the covering profile—which has been advantageously cut from the rolled coil and given the desired shape by roll forming/bevelling/turning edges up or over.

To eliminate the above-mentioned faults, a continuously unwinding composite profile—like extrusion for the carrier profile and roll forming—over the whole profile length of covering profile and insert rods or anchoring profiles is proposed. The connection is made by continuous welding over the profile length.

The requirement is a maximum possible width of the sliding surface with the possibility of spreading from the side and mechanical anchoring which, even with completely worn wear profiles, ensures anchoring of the remaining sliding surfaces of which there are then two. Also, a reduction of the fitted height tolerances compared with known composite profiles is desired. The possibility of local manufacture worldwide is desirable too, without having to upgrade a large light metal extruder.

BRIEF DESCRIPTION OF THE DRAWINGS

Further advantages, characteristics and details of the invention are apparent from the description below of preferred embodiments and with reference to the drawings, which show FIG. 1: an oblique view of a section of a rail-like composite profile consisting of two composite partners in the form of a rail profile with covering profile and two components connecting them in the form of channel-like insert rods;

FIG. 2: the enlarged end view of the composite profile of FIG. 1, from which an insert rod is taken out on its right profile side;

FIG. 3: the insert rod taken out in FIG. 2 in an end view;

FIG. 4: the end view of the covering profile used as a composite partner in FIG. 1;

FIG. 5: an enlarged detail from FIG. 2 with the insert rod in the connecting position not shown there;

FIG. 6: a representation, corresponding to FIG. 5, of another embodiment of the detail shown in FIG. 5;

FIG. 7: an end view of another embodiment of the composite profile roughly corresponding to FIG. 2 and on a larger scale than the latter;

FIGS. 8 to 10: drawings of manufacturing steps for the conductor rail;

DETAILED DESCRIPTION

Figure 11:
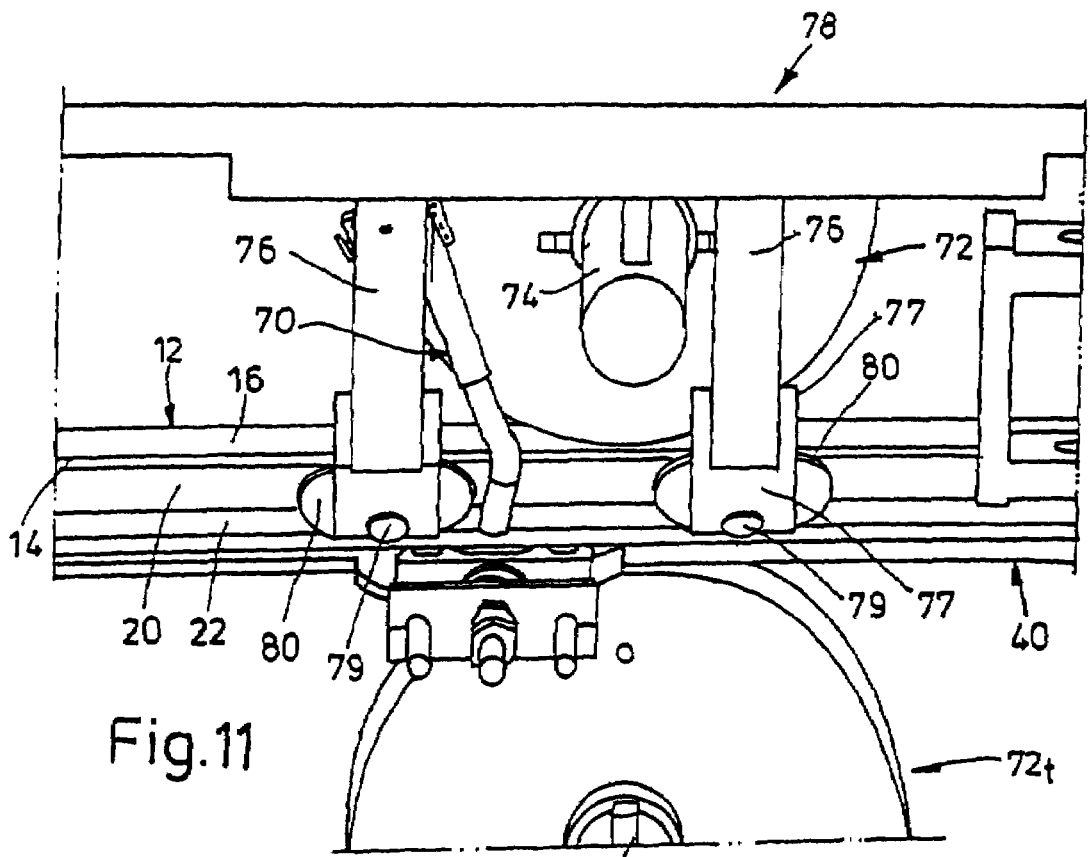
FIG. 11: a drawing of a production frame for the conductor rail.

A composite profile 10 with a height h of 105 mm here and a maximum width b of 92 mm according to FIG. 1 comprises a rail-like carrier profile 12 having a rail foot 14 and a continuous rail head 22 formed integrally on the latter by means of a rail web 20. Two longitudinal edges 17 with a height c of 10 mm defining the foot surface 16 of the rail foot 14 run parallel to each other at a distance $b_1$ of 80 mm here.

From these longitudinal edges 17, the two ridge surfaces 18 of the rail foot 14, which are somewhat inclined towards them, are inclined slightly upwards to the cross-sectional centre axis Q crossing the longitudinal axis A of the composite profile 10, and merge with that axial rail web 20 with a height $h_1$ of approximately 30 mm and a thickness e of approximately 18 mm. Adjoining the upper end of the rail web 20 are the lower surface 26 which extends to the longitudinal edges 24 of the rail head 22 and of which the width $b_2$ measures approximately 78 mm and of which the outside height n of approximately 28 mm defines the position of the rail head surface 28.

From each of the longitudinal edges 24 of the rail head 22 in FIGS. 1, 2 extends an insertion slot 30 which is inclined upwards at an angle w of approximately 60° to the cross-sectional longitudinal axis Q and which has a width a of 3 mm here and a depth t of 18 mm and of which the lower wall surface in FIG. 2 merges with a kind of longitudinal rib 34 of the rail head 22; the outer side of the longitudinal rib 34 is formed by that lower surface 26. In the longitudinal edge 24 is made a longitudinal recess 32, forming a cross-sectional step 33, as a three-dimensional extension of the cross-sectionally V-shaped slot 30 which also provides its width a.

This rail or carrier profile 12 of the composite profile 10 is formed from a light metal material, in particular an aluminium alloy, in an extruder not shown in the drawings for reasons of clarity.

The flat top or upper surface 28 of the rail profile 12 or its rail head 22 is in the final state spanned by a profile strip 40 with a thickness f of 6 mm which is made from a ferrous or non-ferrous heavy metal. This profile strip 40 is cross-sectionally channel-shaped, and its side arms 46 with a height $c_1$ of 18 mm, which extend from a base plate 42 and are parallel to each other and to the longitudinal axis B of the profile strip 40, abut against the longitudinal edges 24 of the rail head 22. In this position the flat outer surface 44 of width q of the profile strip 40 forms the surface of the composite profile 10.

Associated with parallel axis with each side arm 46 of the profile strip 40 resting on the surface 28 of the rail head 22 is, on the inside, a channel-like insert rod 50 with an approximately V-shaped cross-section of an apex angle $w_1$ of approximately 60°, of which the cross-sectionally linear channel arms 49, $49_i$ provide a thickness $a_1$ which with slight play corresponds to the width a of the insertion slot 30 and here measures 2.8 mm, for example. The right channel arm 49 in FIG. 3 of the insert rod 30, which is also referred to as an anchor rod, is aligned in the fitted position with its outer surface—running parallel to the cross-sectional longitudinal axis Q—with the inner surface of the side arm 46 of the profile strip 40. The distance $c_2$ from the end edge 47 of the profile strip side arm 46—and hence also the longitudinal edge 48 of a channel arm 49 of the insert rod or profile 50, to the inner lower surface 45 of the profile strip 40 is 11.9 mm here; the longitudinal edge 48 of the channel arm 49 which according to FIG. 3 runs at only a short axial parallel distance i from the free end of the other channel arm $49_i$ is aligned in the fitted position approximately with the end face 47 of the profile strip side arm 46.

The end face 47 of the profile side arm 46 is sealingly welded to that longitudinal edge 48 of the channel arm 49 by a weld seam shown at 52. The latter runs on that end face 47 of the profile strip side arm 46 and on the outer surface of the outer channel arm 49 in such a way that its outer surface 51—forming a sloping surface—is inclined at an angle y of approximately 40° cross-sectionally to the insert rod 50. Preferred is a cross-section of the weld seam 52 after the fashion of a right-angled and isosceles triangle of which the two arms defining the right angle are therefore of approximately the same length; the sloping surface 51 is then a hypotenuse.

Each side arm 46 of the profile strip 40 forms a fixed unit, owing to the position of the weld seam 52 described, with the latter and the insert rod 50. In FIG. 5 the weld seam 52 and its sloping surface 51 extend from the outer edge of the end face 47. Here the cross-sectional width z of the weld seam 52 measures approximately 3 mm, and so corresponds approximately to the thickness $a_1$ of the wall of the insert rod 50. In FIG. 6 the cross-sectional width z of the weld seam $52_e$ is smaller, because here the sloping surface 51 attaches to the end face 47 at a distance from its outer edge 43. A maximum of 1/10 mm to 2/10 mm is left free at the end face 47 so that the welding material can take up the aluminium. The other channel arm $49_i$ is inserted in the adjacent slot 30 of the rail head 22. The angle γ here measures approximately 45°.

In FIG. 6 is shown as a further embodiment at 54 a counter-bead of the weld seam $52_e$ which is formed continuously on the inside of the closed gap between the side arm 46 and the insert profile 50 owing to a through-gap existing between the two parts 46, 50. This counter-bead 54 can be formed both on this weld seam $52_e$ and on the weld seam 52 of FIG. 5.

A permanent and tight bond of the two composite partners 12, 40 of the composite profile 10 which is under mechanical prestressing is formed. This prestressing between the composite partners determines their capacity for use; for this prestressing is vital for the contact resistances, the corrosion behaviour and hence for the life of current transmission.

In FIG. 7 can be seen the head region of the carrier profile 12, on a larger scale than FIG. 2, with a top casing 60 which spans its top surface 28—as stated, preferably made of steel—and of which the cross-section is formed from the covering profile 40, the two insert rods 50 and the weld seams 52 connecting the latter into a unit. With the arrows at D, uniform delivery of current from the topic casing 60 to the rail head 22 is symbolised.

By way of examples, cross-sectional values of the materials used, aluminium (number I) and steel (number II), are compiled below:

| I | | | II | | |
|---|---|---|---|---|---|
| Cross-sectional area: | 4517.28 | mm$^2$ | Cross-sectional area: | 778.34 | mm$^2$ |
| Density: | 2.7 | kg/dm$^3$ | Density: | 7.8 | kg/dm$^3$ |
| Weight per linear meter: | 12,197 | kg/m | Weight per linear meter: | 6,071 | kg/m |
| Centre-of-gravity system | | | Centre-of-gravity system | | |
| Moment of inertia $I_x$: | 164.61 | cm$^4$ | Moment of inertia $I_x$: | 72.49 | cm$^4$ |
| Moment of inertia $I_y$: | 527.13 | cm$^4$ | Moment of inertia $I_y$: | 4.66 | cm$^4$ |
| Moment of deviation $I_{xy}$: | 0 | cm$^4$ | Moment of deviation $I_{xy}$: | 0 | cm$^4$ |
| Principal item system | | | Principal item system | | |
| Principal moment of inertia $I_1$: | 164.61 | cm$^4$ | Principal moment of inertia $I_1$: | 4.66 | cm$^4$ |
| Principal moment of inertia $I_2$: | 527.13 | cm$^4$ | Principal moment of inertia $I_2$: | 72.49 | cm$^4$ |
| Length outer contour: | 485.34 | mm | Length outer contour: | 328.31 | mm |
| Length inner contour: | 0 | mm | Length inner contour: | 0 | mm |

FIGS. 8 to 12 illustrate the manufacturing method according to the invention. First the two insert rods 50 made of special steel are delivered to the extruded rail profile 12 as in FIG. 8 and their inner channel arms 49$_i$ are inserted in the respective insertion slots 30. Then all the special steel profiles, that is, the insert rods 50 and the covering profile 40, are pressed on, the latter against the top surface 28 of the rail or carrier profile 12 (FIG. 9). Then these parts are welded under pressure P; welding jets used are marked 70.

As already mentioned, the insert rods 50 formed from steel are modified in such a way that lateral welding through to the aluminium of the carrier profile 12 takes place. Welding through to the aluminium leads above all to the contact resistance being uniformly good over the whole length—that is, regardless of tolerances—and current collection can take place uniformly over the whole steel surface. Also the possibility of the steel or profile strip 40 sliding on the carrier profile 12 due to thermal stresses is excluded.

Resting on a lower contact pressure roller 72$_t$ in FIG. 11 is the unit consisting of covering profile 40 and rail profile 12 with which—not visibly—the two insert rods 50 are associated. An upper contact pressure roller 72 is associated with the foot surface 16 of the rail foot 14. These special rollers 72, 72$_t$ which are mounted on parallel shafts 74 and adapted exert the necessary vertical pressure, while lateral pressure plates 80 which are rotatable on bearing arms 76 of a ridge frame 78 inclined on axles 79 of holding plates 77 exert pressure on the insert rods 50. This is a modified roller straightening machine for light metal profiles. In order to achieve optimum prestressing here, welding is carried out between the contact pressure rollers 72, 72$_t$ made of non-magnetic material—and in fact the two sides are worked simultaneously.

Figure 12:
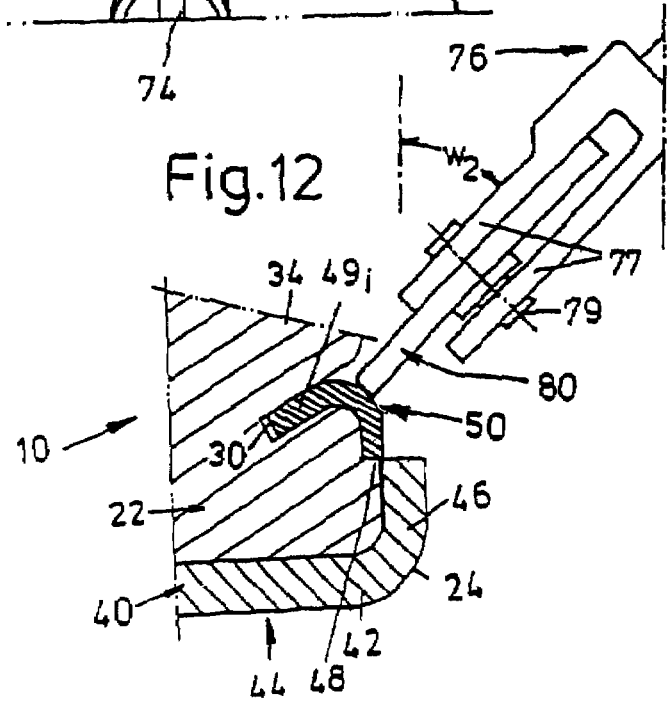
FIG. 12: an enlarged detail of the conductor rail in the production frame in the end view of FIG. 11.

FIG. 12 shows an essential detail of the conductor rail 10 according to the invention which provides the required prestressing. A corner region of the rail head 22 with insertion slot 30 can be seen and, lying stationarily in the latter, an insert rod 50 which on the other side is joined to the side arm 46 of the profile strip or covering profile 40 and is pressed during the welding operation by those pressure plates 80, which are held at an angle of inclination w$_2$ of approximately 35°.

The invention claimed is:

1. A composite profile comprising:
   (1) an extruded aluminum alloy carrier profile comprising a rail head having a longitudinal axis B, the rail head comprises a surface and two longitudinal edges extending parallel to the longitudinal axis B and (2) a metal channel shaped profile strip comprising a base portion spanning the surface of the rail head and parallel side legs which lie on the longitudinal edges of the head rail, an insert rod is provided on each of the parallel side legs which lie on the longitudinal edges of the head rail and engage in lateral slots provided in the two longitudinal edges of the rail head, wherein the profile strip is attached to the carrier profile under mechanical pretension by way of a weld seam which contacts the rail head of the extruded aluminum alloy carrier profile, the insert rod is of approximately V-shaped cross-section comprising an outer channel arm having a longitudinal edge associated with an end face of the side legs of the profile strip and rigidly connected to the profile strip by the weld seam, wherein the weld seam has an approximately triangular cross-section with two sides at right angles to each other, wherein one side is formed integrally with the end face of the profile strip and the other side is formed integrally with the outer surface of the associated channel arm of the insert rod.

2. A composite profile according to claim 1, wherein another channel arm of the insert rod is directed towards the longitudinal axis (B) of the rail and forms with the outer channel arm an apex angle (w$_1$) of less than 90°, the other channel arm is mounted in the slot inclined at a corresponding angle (w) to a cross-sectional longitudinal axis (Q) of the carrier profile.

3. A composite profile according to claim 2, wherein the apex angle (w$_1$) of a channel cross-section measures about 60° to 7°.

4. A composite profile according to claim 1, wherein the longitudinal edge of the outer channel arm runs at a short axial parallel distance (i) from a free end of the other channel arm.

5. A composite profile according to claim 4, wherein, in a fitted position, an end face of the side leg of the profile strip is approximately aligned with the longitudinal edge of the outer channel arm.

6. A composite profile according to claim 4, wherein the slot in the rail head of the carrier profile is V-shaped in cross-section, a longitudinal recess is formed in the longitudinal edges of the rail head.

7. A composite profile according to claim 1, wherein the two sides form an approximate isosceles cross-section of the weld seam which are connected by a hypotenuse as a sloping surface.

8. A composite profile according to claim 7, wherein the weld seam with its sloping surface attaches to the outer edge of the end face of the profile strip.

9. A composite profile according to claim 8, wherein a cross-sectional width (z) of the weld seam corresponds roughly to a thickness (a$_1$) of the insert rod.

10. A composite profile according to claim 1, wherein the weld seam attaches to the end face of the profile strip at a distance from its outer edge.

11. A composite profile according to claim 10, wherein the cross-sectional width (z) of the weld seam is smaller than the thickness (a$_1$) of the insert rod.

12. A method for manufacturing a composite profile according to claim 1, including extruding the carrier profile from light metal material, introducing into each slot the insert rod, and forming the profile strip of harder material than the material of the rail head so that the profile strip is subject to prestressing when applied to the rail head, welding the insert rod to the profile strip under prestressing, wherein a counter-bead connected to a weld seam is made by the welding operation at an inner surface of the profile strip and insert rod which is adjacent to the weld seam.

13. A composite profile comprising:
   (1) an extruded aluminum alloy carrier profile comprising a rail head having a longitudinal axis B, the rail head comprises a surface and two longitudinal edges extending parallel to the longitudinal axis B and (2) a metal channel shaped profile strip comprising a base portion spanning the surface of the rail head and parallel side legs which lie on the longitudinal edges of the head rail, an insert rod is provided on each of the parallel side legs which lie on the longitudinal edges of the head rail and engage in lateral slots provided in the two longitudinal edges of the rail head, wherein the profile strip is attached to the carrier profile under mechanical pretension by way of a weld seam which contacts the rail head of the extruded aluminum alloy carrier profile, wherein associated with the weld seam is a counter-bead made of the material of the weld seam, the counter-bead fits snugly against inner surfaces of the profile strip and insert rod facing away from the weld seam.

14. A composite profile according to claim 13, wherein a longitudinal edge of the insert rod and the region of the profile inner surface of the profile strip adjoining the edge as surfaces abutting against the counter-bead.

15. A composite profile according to claim 13, wherein the weld seam and counter-bead run parallel to each other.

16. A composite profile according to claim 15, wherein the weld seam and counter-bead are in one piece.

\* \* \* \* \*